(12) United States Patent
Muckelrath et al.

(10) Patent No.: US 8,764,036 B2
(45) Date of Patent: Jul. 1, 2014

(54) SHOCK MOUNT SUPPORT ASSEMBLY FOR HEAVY-DUTY VEHICLES

(75) Inventors: Brett L. Muckelrath, North Canton, OH (US); Keith D. McComsey, Hinckley, OH (US); Sri Satya T. Kakarla, Canton, OH (US); Ryan J. Lippincott, Minerva, OH (US); James J. Patterson, North Canton, OH (US); R. Scott Fulton, Hudson, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 317 days.

(21) Appl. No.: 13/359,629

(22) Filed: Jan. 27, 2012

(65) Prior Publication Data

US 2012/0193490 A1    Aug. 2, 2012

Related U.S. Application Data

(60) Provisional application No. 61/437,307, filed on Jan. 28, 2011.

(51) Int. Cl.
*B60G 9/00* (2006.01)
*B62D 21/11* (2006.01)
*B60G 13/00* (2006.01)
*F16F 9/00* (2006.01)

(52) U.S. Cl.
CPC ............ *B60G 13/005* (2013.01); *F16F 9/00* (2013.01); *B60G 2204/129* (2013.01); *B60G 2300/02* (2013.01)
USPC ............ 280/124.116; 280/124.109; 180/227; 248/205.1

(58) Field of Classification Search
USPC ............ 280/124.116, 124.109; 180/227, 311; 188/321.11; 248/205.1
See application file for complete search history.

(56) References Cited

U.S. PATENT DOCUMENTS

| | | | |
|---|---|---|---|
| 3,642,302 A | | 2/1972 | Hickman |
| 3,768,828 A | * | 10/1973 | Klein ..................... 280/124.162 |
| 3,930,547 A | * | 1/1976 | West .............................. 280/25 |
| 3,960,388 A | | 6/1976 | Strader et al. |
| 3,986,693 A | * | 10/1976 | Johnson .................... 248/205.1 |
| 4,168,086 A | | 9/1979 | Dick et al. |
| 4,615,539 A | * | 10/1986 | Pierce .................... 280/124.116 |
| 5,720,489 A | | 2/1998 | Pierce et al. |

* cited by examiner

*Primary Examiner* — Faye M Fleming
*Assistant Examiner* — Darlene P Condra
(74) *Attorney, Agent, or Firm* — Dureska, Kennedy & Moore, L.L.C.; David P. Dureska; Brent L. Moore

(57) ABSTRACT

A shock mount support assembly for a shock absorber of a suspension assembly of an axle/suspension system includes a shock support bracket formed with an opening. A fastener is disposed through the opening in the shock support bracket and an eyelet of the lower end of the shock absorber to loose-fit the shock support bracket to the shock absorber, and to the suspension assembly beam in a transverse direction. The shock support bracket includes at least one transversely elongated or oversized opening that aligns with an opening formed in the beam. A fastener is disposed through the pair of aligned openings in order to loose-fit attach the shock support bracket to the beam. During assembly, the eyelet fastener is tightened first drawing the shock support bracket transversely outboardly. The fastener disposed through the shock support bracket-to-beam attachment is tightened, rigidly attaching the shock support bracket to the suspension assembly.

22 Claims, 13 Drawing Sheets

SHOCK MOUNT SUPPORT ASSEMBLY FOR HEAVY-DUTY VEHICLES

CROSS-REFERENCE TO RELATED APPLICATION

This application claims the benefit of U.S. Provisional Patent Application Ser. No. 61/437,307, filed Jan. 28, 2011.

BACKGROUND OF THE INVENTION

1. Field of the Invention

The invention relates to heavy-duty vehicles and in particular to axle/suspension systems of heavy-duty vehicles such as semi-trailers. More particularly, the present invention is directed to a mount for the shock absorber component of axle/suspension systems. More specifically, the present invention relates to a shock absorber lower mount support assembly and method for installation, which includes placement of a support assembly on the inboard side of the shock mount assembly and wherein the support assembly is also mounted on the beam of its respective suspension assembly. This mounting arrangement and method of installation results in satisfactory conservation of the clamp load of the shock mount assembly at the shock absorber-shock mount interface, which in turn strengthens the connection of each shock absorber to its respective suspension assembly of the axle/suspension system, resulting in greater absorption of stresses, forces and/or loads encountered by the vehicle as it travels over the road, thereby minimizing the possibility of damage to the suspension assembly, hanger and/or vehicle frame.

2. Background Art

The use of air-ride trailing and leading arm rigid beam-type axle/suspension systems has been popular in the heavy-duty truck and tractor-trailer industry for many years. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members that form the frame of the vehicle. More specifically, each beam is pivotally connected at one of its ends to a hanger, which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The opposite end of each beam also is connected to an air spring, or its equivalent, which in turn is connected to a respective one of the main members. A height control valve is mounted on the hanger or other support structure and is operatively connected to the beam and to the air spring in order to maintain the ride height of the vehicle. A brake system and one or more shock absorbers, which provide damping to the vehicle axle/suspension system, are also included. The beam may extend rearward or frontward from the pivotal connection relative to the front of the vehicle, thus defining what are typically referred to as trailing arm or leading arm axle/suspension systems, respectively. However, for purposes of the description contained herein, it is understood that the term "trailing arm" will encompass beams that extend either rearward or frontward with respect to the front end of the vehicle.

The one or more axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental affect of these forces on the vehicle as it is operating, the axle/suspension system is designed to react and/or absorb at least some of these forces.

These forces include vertical forces caused by vertical movement of the wheels as they encounter certain road conditions, fore-aft forces caused by acceleration and deceleration of the vehicle, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to be fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces. A key component of the axle/suspension system that cushions the ride of the vehicle from vertical impacts is one or more air springs, while one or more shock absorbers typically provide damping characteristics to the axle/suspension system.

More particularly, shock absorbers have been used for many years on various types of prior art air-ride axle/suspension systems to dampen the vertical movement of the vehicle as it travels over the road. A typical prior art shock absorber is attached at its upper end to a shock upper mount assembly, which includes a clevis and fastener mounted on the hanger of its respective suspension assembly. The lower end of the shock absorber is mounted to the beam of its respective suspension assembly by a shock lower mount assembly. Thus, the shock absorber dampens vertical movement of the beam of its respective suspension assembly during operation of the vehicle.

The heavy-duty vehicle industry has progressively developed more robust shock absorbers with increased damping characteristics that provide greater control over a vehicle's vertical movement. However, the use of these more robust shock absorbers with increased damping characteristics can also require more robust mounting of the shock absorber. More specifically, when utilizing a more robust shock absorber with increased damping characteristics, the shock lower mount assembly can potentially exhibit a reduced clamp load and decreased durability over the life of the shock lower mount assembly when utilizing known means for mounting the shock lower mount assembly to its respective suspension beam. More particularly, when the clamp load of the shock lower mount assembly is compromised, the bolt of the shock lower mount assembly can loosen or bend, thereby decreasing shock lower mount assembly performance as well as potentially decreasing the life of the shock lower mount assembly. This potential reduced clamp load and decreased durability of the shock lower mount assembly can in turn result in increased maintenance and/or replacement costs and could potentially cause damage to the suspension assembly, shock absorber, hanger, or the vehicle frame, which could result in additional maintenance and or replacement costs.

The shock mount support assembly for heavy-duty vehicle axle/suspension systems of the present invention solves the above-noted problems by providing an improved shock lower mount support assembly and method for installation of the assembly that facilitates reduced stress at the shock lower mount interface to the beam of its respective suspension assembly. This is achieved due to the structure of the shock lower mount support assembly conserving the clamp load at the shock lower mount-beam interface, by providing a broader area of support to the shock lower mount-beam attachment interface, and by distributing loads from both the inboard and outboard attachment points of the shock absorber to the beam of its respective suspension assembly. By utilizing the shock mount support assembly for heavy-duty vehicle axle/suspension systems of the present invention, a more robust shock absorber can in turn be utilized on the vehicle to absorb forces common to highway travel with much greater efficiency and less risk of decreasing durability of the shock absorber, mounting structure and/or other components such as the vehicle frame, hanger or suspension assembly.

SUMMARY OF THE INVENTION

Objectives of the present invention include providing a shock mount support assembly and method for installation of the assembly that reduces stress at the shock lower mount-beam interface of its respective suspension assembly.

A further objective of the present invention is to provide a shock mount support assembly and method for installation of the assembly that provides a broader area of support to the shock lower mount-beam attachment interface.

Yet another objective of the present invention is to provide a shock mount support assembly and method for installation of the assembly that distributes loads from both the inboard and outboard attachment points of the shock absorber to the beam of its respective suspension assembly.

Still another objective of the present invention is to provide a shock mount support assembly and method for installation of the assembly that allows for a more robust shock absorber to be utilized on the vehicle to absorb forces common to highway travel with much greater efficiency and less risk of decreasing durability of the shock absorber, mounting structure and/or other components such as the vehicle frame, hanger or suspension assembly.

These objectives and advantages are obtained by the shock mount support assembly for a shock absorber of a suspension assembly of an axle/suspension system of a vehicle. The shock absorber is operatively attached at its lower end to the suspension assembly and operatively attached at its upper end to a fixed component of a frame of the vehicle. The shock mount support assembly of the present invention including the lower end of the shock absorber connected to a shock support bracket. The shock support bracket in turn is rigidly attached to the suspension assembly for supporting the lower end of the shock absorber during operation of the vehicle.

These objectives and advantages are also obtained by the method for installing a shock absorber of a suspension assembly of an axle/suspension system of a vehicle, the shock absorber operatively attached at its lower end to the suspension assembly and operatively attached at its upper end to a fixed component of a frame of the vehicle, the method including the following steps; a) providing a shock support bracket including an opening, the opening aligned with an opening formed in the suspension assembly; b) disposing a first fastener through the pair of aligned shock support bracket and suspension assembly openings and loose-fitting the first fastener, and disposing a second fastener through an opening in the shock support bracket and an eyelet of the lower end of the shock absorber and loose-fitting the second fastener; c) torquing to specification the second fastener to connect the shock support bracket to the shock absorber lower end eyelet; and d) tightening the first fastener to rigidly attach the shock support bracket to the suspension assembly.

These objectives and advantages are also obtained by the method for installing a shock absorber of a suspension assembly of an axle/suspension system of a vehicle, the shock absorber operatively attached at its lower end to the suspension assembly and operatively attached at its upper end to a fixed component of a frame of the vehicle, the method including the following steps; a) providing a shock support bracket including an opening, the opening aligned with an opening formed in the suspension assembly; b) providing a plate disposed on the suspension assembly opposite the shock support bracket, the plate being formed with an opening, the opening aligned with the suspension assembly opening and the support bracket opening; c) disposing a first fastener through the aligned openings of the shock support bracket, the suspension assembly and the plate and loose-fitting the first fastener, and disposing a second fastener through an opening in the shock support bracket and an eyelet of the lower end of the shock absorber and loose-fitting the second fastener; d) torquing to specification the second fastener to connect the shock support plate to the shock absorber lower end eyelet; and e) tightening the first fastener disposed through the aligned openings of the shock support bracket, the suspension assembly and the plate, to rigidly attach the shock support bracket and the plate to the suspension assembly.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENT

Figure 1:
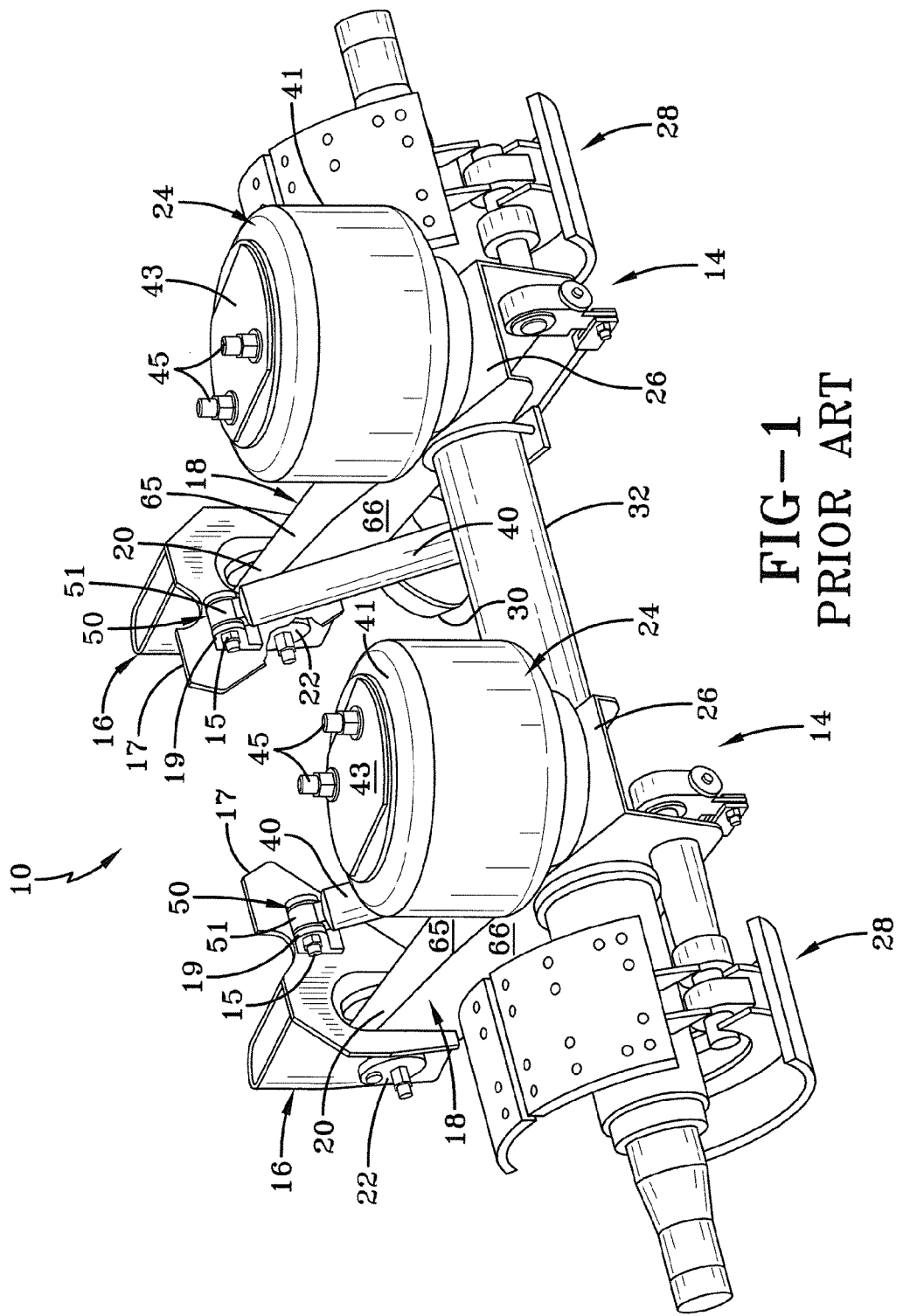
FIG. 1 is a top rear perspective view of a heavy-duty vehicle axle/suspension system incorporating a pair of shock absorbers, and showing the prior art shock upper mount assemblies attaching each one of the upper ends of the pair of shock absorbers to a respective one of the hangers on which the suspension assemblies of the axle/suspension system are mounted.
Figure 2:
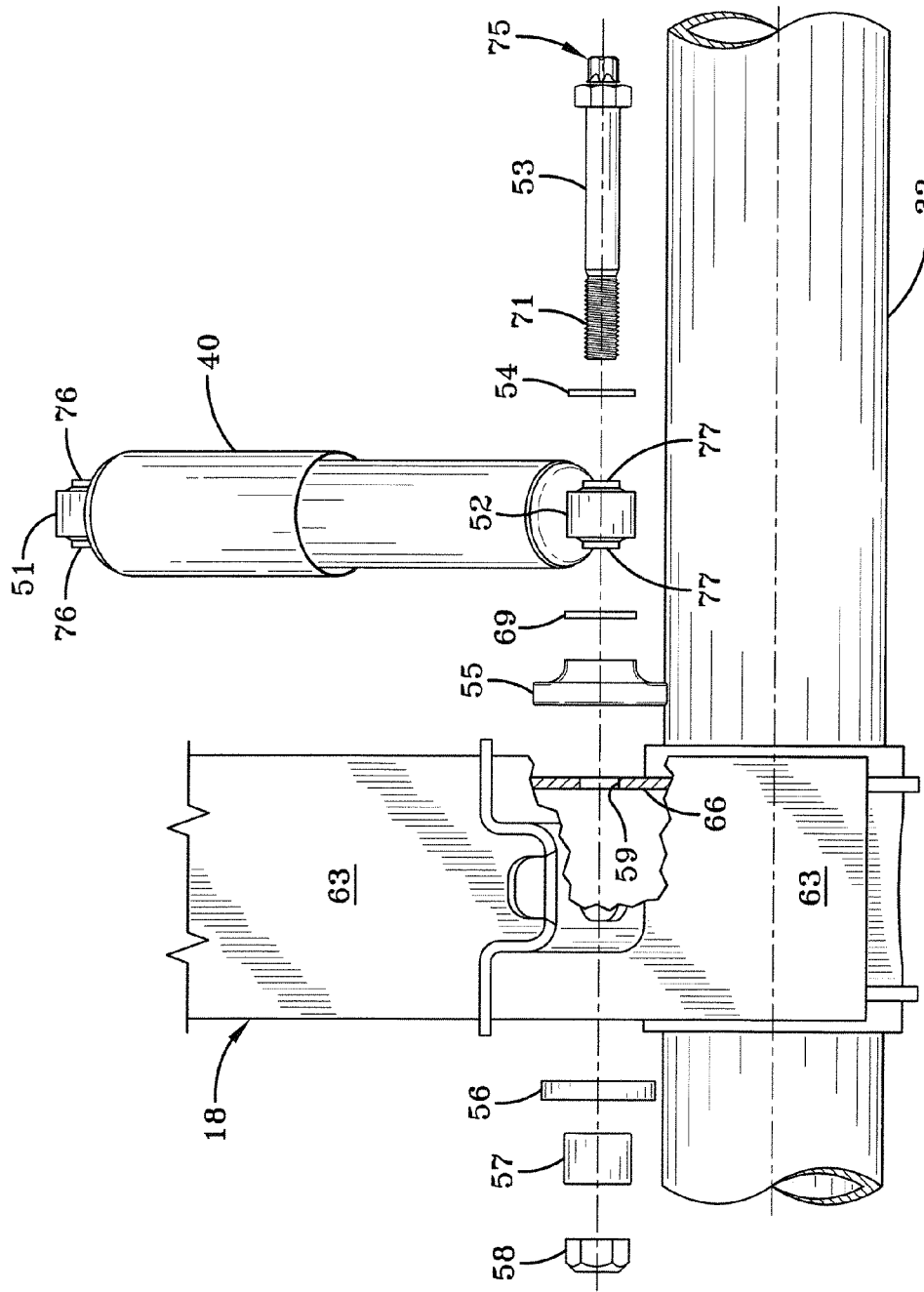
FIG. 2 is an enlarged fragmentary bottom view of a portion of the driver side suspension assembly, with portions broken away and in section, and showing an exploded view of a prior art shock lower mount assembly which attaches the lower end of the shock absorber to the beam of the suspension assembly (Reference herein is made to driver side and curb side of the vehicle with the understanding that such arrangement is described in connection with a vehicle operating in North America where the direction of travel is on the right side of the road. It is understood that an opposite configuration would exist for those vehicles operating in certain regions of the world where the direction of travel is located on the left side of the road)
Figure 3:
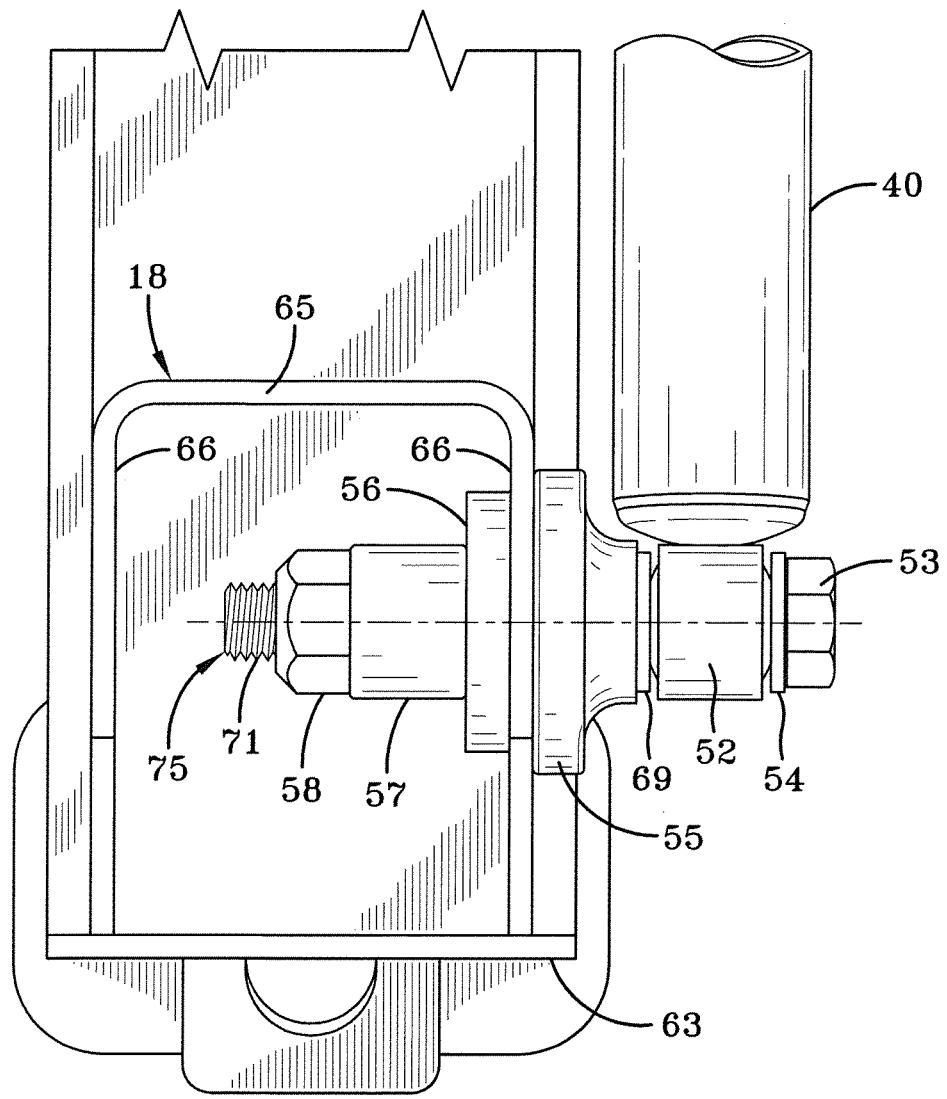
FIG. 3 is greatly enlarged rear fragmentary view of the assembled prior art shock lower mount assembly shown in FIG. 2.

In order to better understand the environment in which the shock mount support assembly for heavy-duty vehicles of the present invention is utilized, a trailing arm overslung beam-type air-ride axle/suspension system that incorporates a prior art shock absorber utilizing known prior art means for mounting the shock absorber to the suspension assembly, is indicated generally at 10, is shown in FIGS. 1-3, and now will be described in detail below.

It should be noted that axle/suspension system 10 is typically mounted on a pair of longitudinally-extending spaced-apart main members (not shown) of a heavy-duty vehicle, which is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. Because axle/suspension system 10 generally includes an identical pair of suspension assemblies 14, for sake of clarity only one of the suspension assemblies will be described below.

Suspension assembly 14 is pivotally connected to a hanger 16 via a trailing arm overslung beam 18. More specifically, beam 18 is formed having a generally upside-down integrally formed U-shape with a pair of sidewalls 66 and a top plate 65, with the open portion of the beam facing generally downwardly. A bottom plate 63 extends between and is attached to the lowermost ends of sidewalls 66 by any suitable means such as welding to complete the structure of beam 18. Trailing arm overslung beam 18 includes a front end 20 having a bushing assembly 22, which includes a bushing, pivot bolts and washers as are well known in the art, to facilitate pivotal connection of the beam to hanger 16. Beam 18 also includes a rear end 26, which is welded or otherwise rigidly attached to a transversely extending axle 32.

Suspension assembly 14 also includes an air spring 24, mounted on and extending between beam rear end 26 and the main member (not shown). Air spring 24 includes a bellows 41 and a piston (not shown). The top portion of bellows 41 is sealingly engaged with a bellows top plate 43. An air spring mounting plate (not shown) is mounted on top plate 43 by fasteners 45, which are also used to mount the top portion of air spring 24 to the vehicle frame (not shown). The piston bottom plate rests on beam top plate 65 at beam rear end 26 and is attached thereto in a manner well known to those having skill in the art, such as by fasteners or bolts (not shown).

With additional reference to FIGS. 2 and 3, a shock absorber 40 extends between and is mounted at its upper end to hanger 16 and at its lower end to suspension beam 18. More particularly, shock absorber 40 includes a top eyelet 51 and a bottom eyelet 52. Top eyelet 51 and bottom eyelet 52 are each formed with a continuous opening 76,77, respectively. With particular reference to FIG. 1, shock top eyelet 51 is mounted on an inboardly extending wing 17 of hanger 16 via a shock upper mount assembly 50, which includes a shock upper mount bracket 19 and a fastener 15. More particularly, fastener 15 is disposed through an opening (not shown) formed in shock mount bracket 19 and aligned continuous opening 76 in top eyelet 51, in order to mount the upper end of shock absorber 40 to hanger 16. With particular reference to FIGS. 2 and 3, shock bottom eyelet 52 is mounted on suspension beam 18 via a shock lower mount assembly 75, which includes a bolt 53, first and second washers 54,69, respectively, an inboard shock spacer 55, a shock backing plate 56, an outboard shock spacer 57 and a lock nut 58. More particularly, bolt 53 includes a threaded end 71 and first washer 54. Bolt threaded end 71 is disposed through first washer 54, through continuous opening 77 formed in shock bottom eyelet 52, through second washer 69, through spacer 55, through an opening 59 formed in suspension beam inboard sidewall 66, through shock backing plate 56, and through outboard shock spacer 57. Lock nut 58 is threaded onto bolt threaded end 71 in order to mount shock bottom eyelet 52 onto suspension beam 18 and to complete the construction of shock lower mount assembly 75.

With continuing reference to FIG. 1, for the sake of relative completeness, a brake system 28 including a brake chamber 30 is shown mounted on prior art suspension assembly 14.

As mentioned above, axle/suspension system 10 is designed to absorb forces that act on the vehicle as it is operating. More particularly, it is desirable for axle/suspension system 10 to be rigid or stiff in order to resist roll forces and thus provide roll stability for the vehicle. This is typically accomplished by using beam 18, which is rigid, and is rigidly attached to axle 32. It is also desirable, however, for axle/suspension system 10 to be flexible to assist in cushioning the vehicle (not shown) from vertical impacts and to provide compliance so that the axle/suspension system resists failure. Such flexibility typically is achieved through the pivotal connection of beam 18 to hanger 16 with bushing assembly 22. Air spring 24 and shock absorber 40 also assist in cushioning the ride for cargo and passengers.

Axle/suspension system 10 is designed to withstand the various load conditions that a trailer will be subjected to during operation of the vehicle. Prior art axle/suspension systems such as system 10, include air springs 24 and shock absorbers 40 for damping the impact on the vehicle frame that is caused by vertical movement as the vehicle travels over the road and encounters changes in road height, such as pot holes, bumps, etc. The more robust the shock absorber 40, the greater its ability to dampen oscillatory motion the vehicle is subjected to during travel. However, the use of such robust shock absorbers 40 can potentially cause reduction of the clamp load at the known prior art shock lower mount assembly 75 and can potentially reduce the durability of the shock lower mount assembly over the life of the shock mount assembly. More specifically, when the clamp load of shock lower mount assembly 75 is compromised, bolt 53 of the shock lower mount assembly can loosen or bend, thereby decreasing the life and performance of the shock lower mount assembly. This possible reduced clamp load at the shock mount interface can lead to decreased durability of shock lower mount assembly 75, which can in turn result in increased maintenance and/or replacement costs and could potentially cause damage to suspension assembly 14, shock absorber 40, hanger 16 or the vehicle frame (not shown) which can potentially require additional maintenance and or replacement costs. The shock mount support assembly for heavy-duty vehicle axle/suspension systems of the present invention overcomes the problems associated with prior art shock lower mount assembly 75 and other known means for mounting the shock lower mount assembly to beam 18, and will now be described in detail below.

Figure 5:
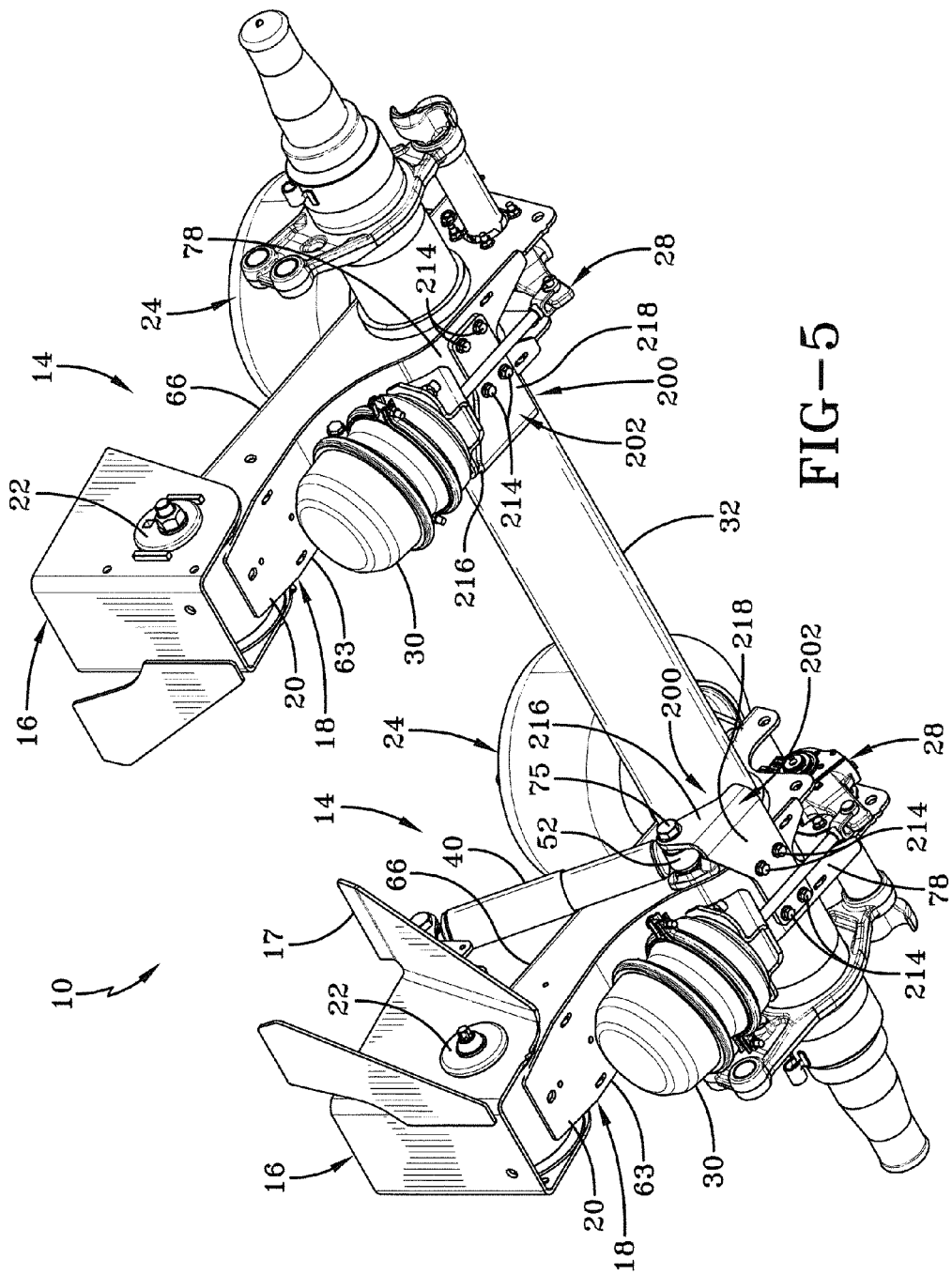
FIG. 5 is a bottom perspective driver side view of an axle/suspension system incorporating a pair of the first preferred embodiment shock mount support assemblies of the present invention shown in FIG. 4, showing each one of the lower end of the shock absorbers mounted on its respective shock mount support assembly which is in turn mounted on the bottom wall of the beam of its respective suspension assembly.
Figure 6:
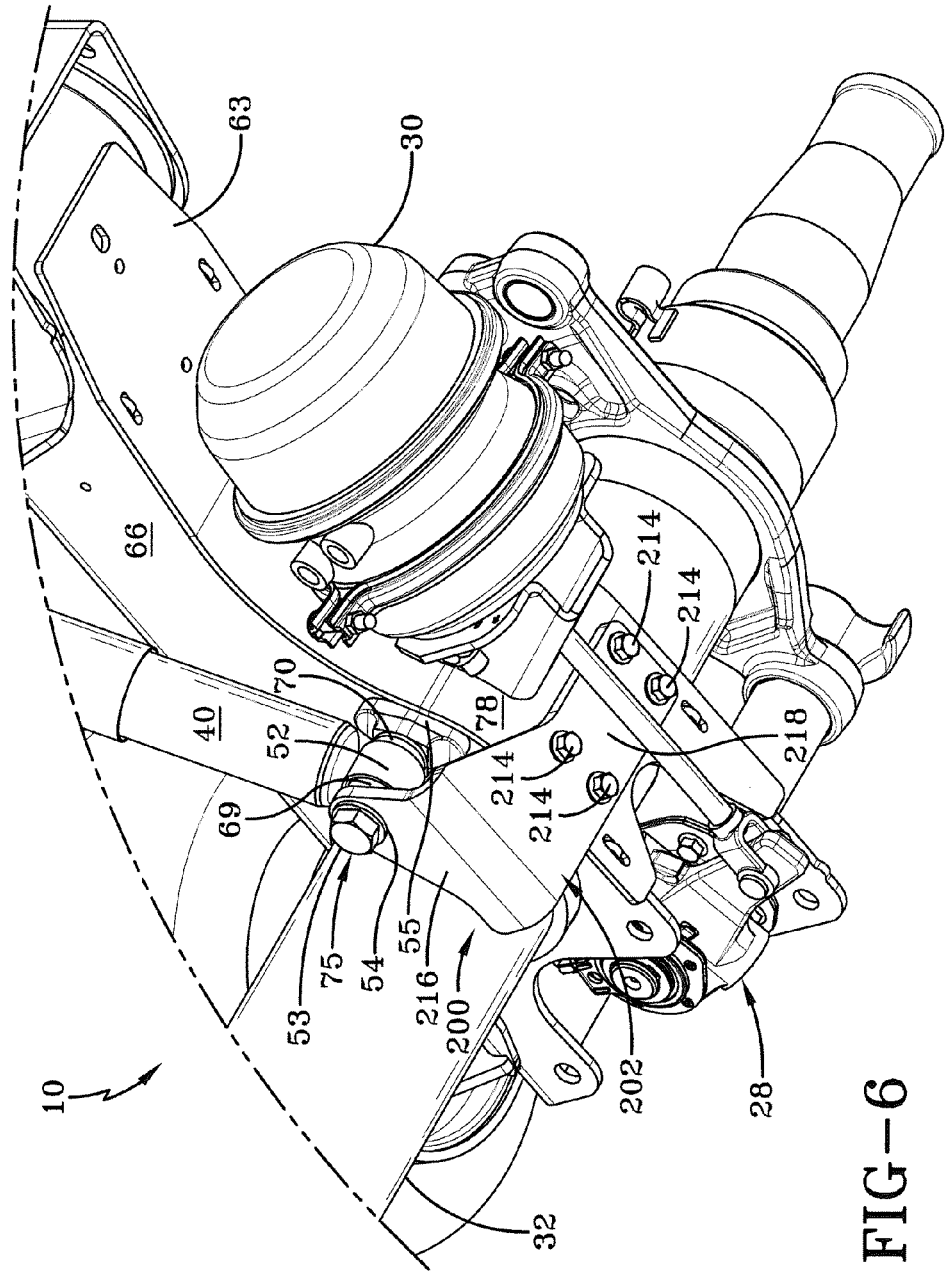
FIG. 6 is a fragmentary bottom perspective view of the driver side suspension assembly shown in FIG. 5 looking in the outboard direction, showing the shock absorber mounted on its respective first preferred embodiment shock mount support assembly of the present invention which is in turn mounted on the bottom wall of the beam of its respective suspension assembly.
Figure 7:
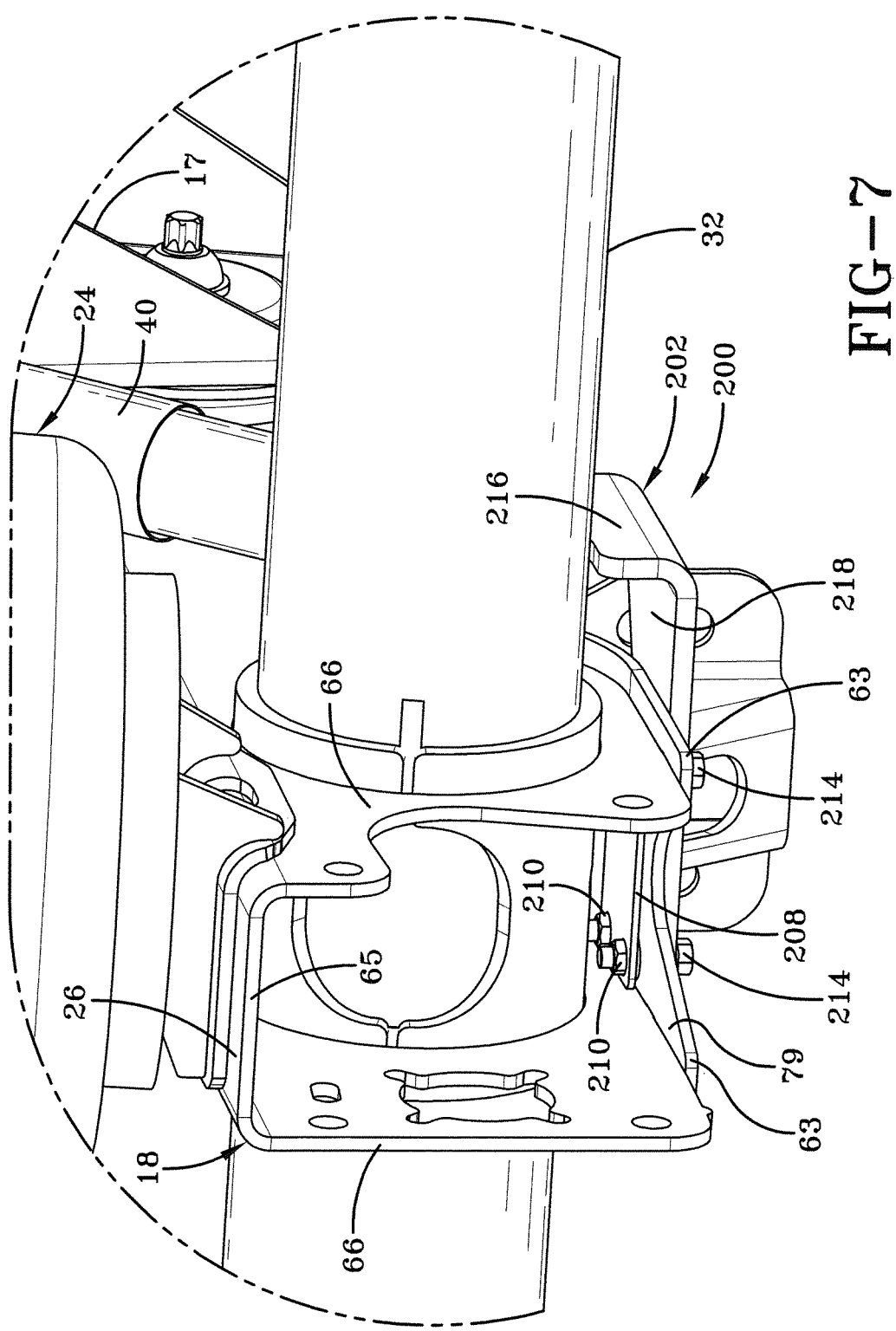
FIG. 7 is a fragmentary rear perspective view of the driver side suspension assembly shown in FIG. 5, showing the shock support bracket and the beam mounting plate of the first preferred embodiment shock mount lower support assembly of the present invention mounted on the bottom wall of the beam of the suspension assembly.
Figure 8:
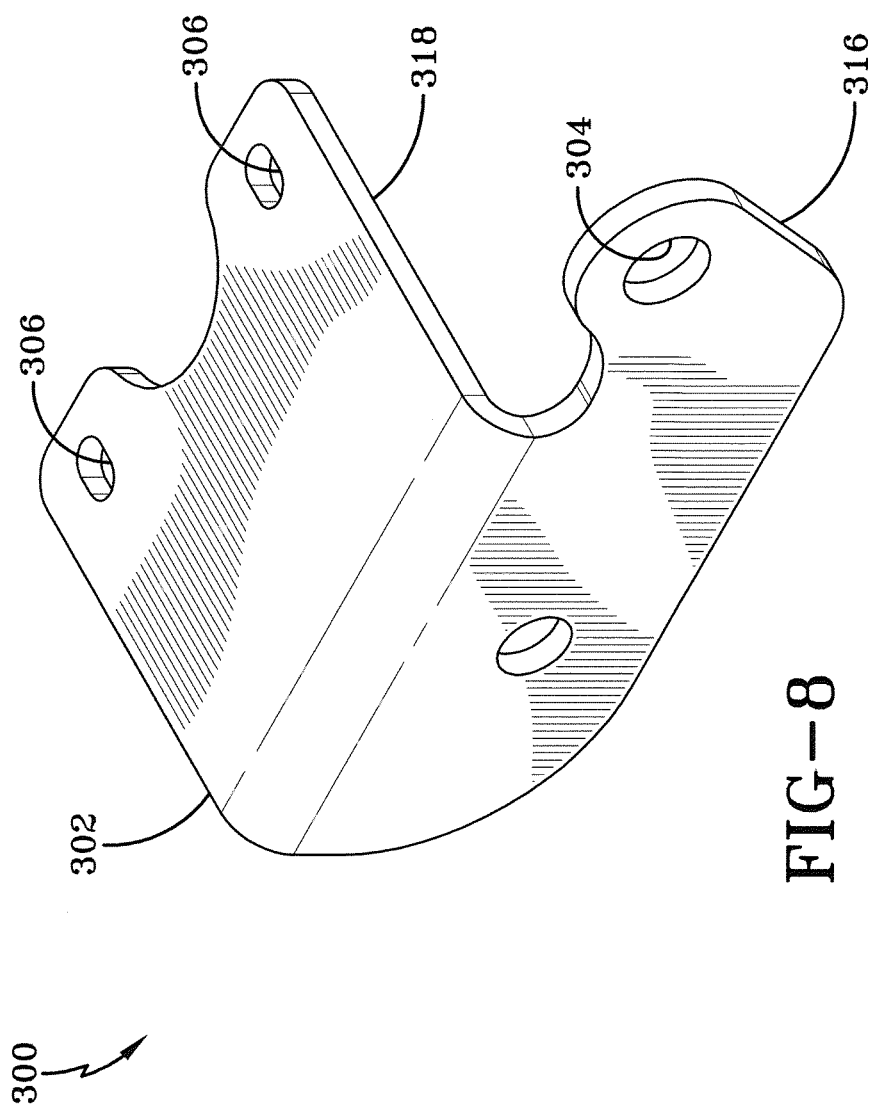
FIG. 8 is a perspective view of a second preferred embodiment shock mount support assembly of the present invention, showing the driver side shock support bracket.
Figure 9:
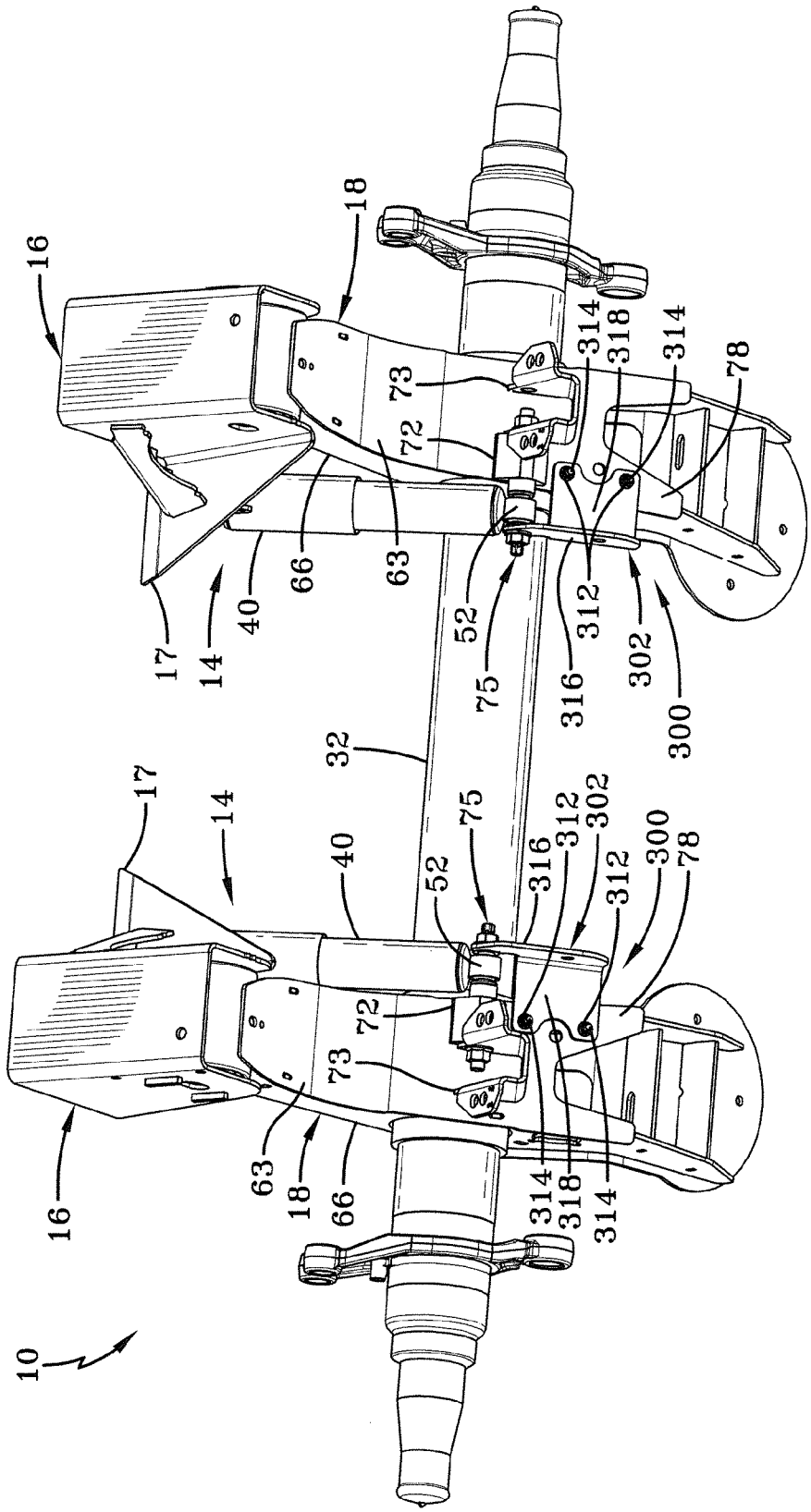
FIG. 9 is a bottom front perspective view of an axle/suspension system incorporating a pair of second preferred embodiment shock lower mount support assemblies of the present invention, showing each one of the shock absorbers mounted on its respective shock mount support assembly which is in turn mounted on the bottom wall of the beam of its respective suspension assembly.
Figure 10:
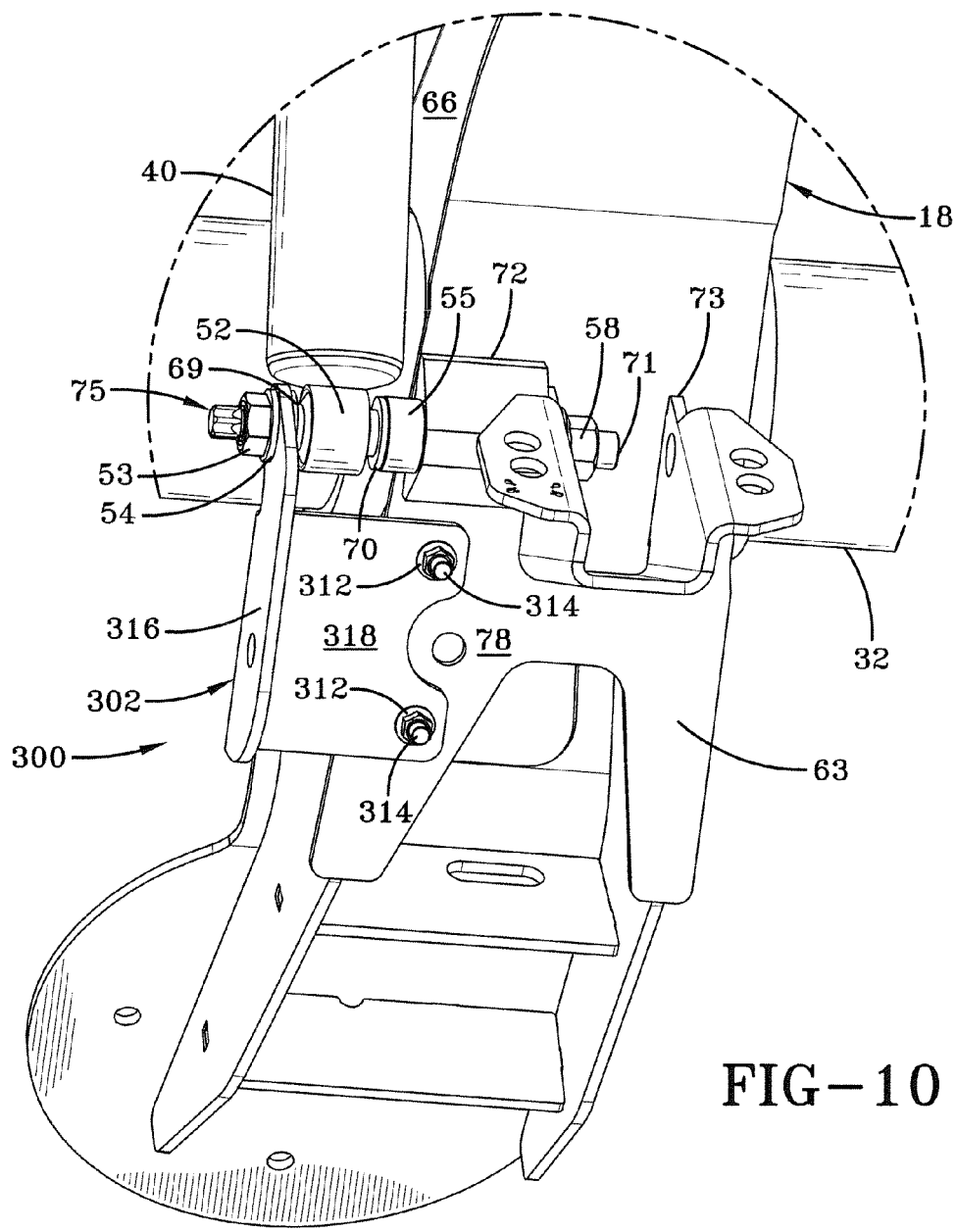
FIG. 10 is a fragmentary bottom perspective view of the driver side suspension assembly shown in FIG. 9, showing the second preferred embodiment shock mount support assembly of the present invention mounted on the bottom wall of the beam of the suspension assembly.
Figure 11:
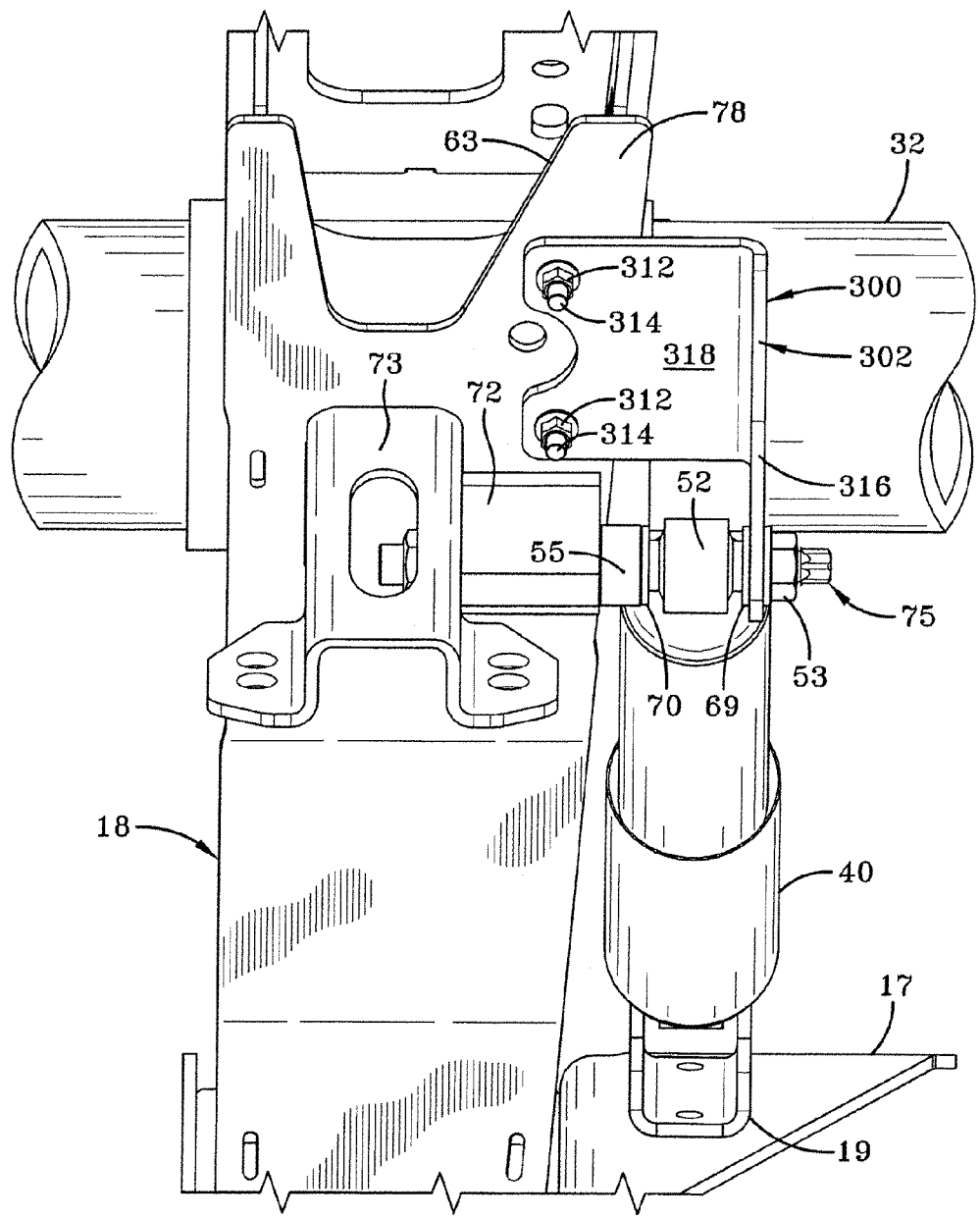
FIG. 11 is a fragmentary bottom rear perspective view of the second preferred embodiment shock mount support assembly shown in FIG. 10.
Figure 12:
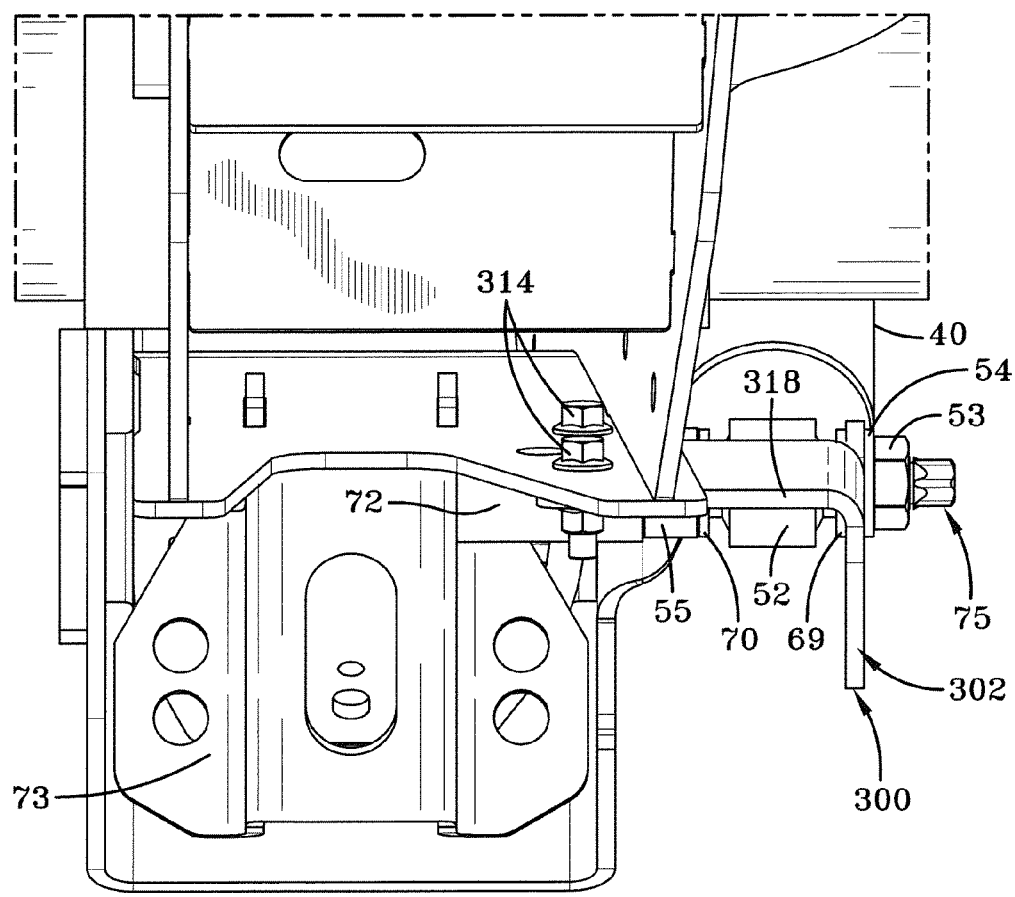
FIG. 12 is a fragmentary bottom rear perspective view of the second preferred embodiment shock mount support assembly shown in FIG. 10.

A first preferred embodiment shock absorber lower mount support assembly for heavy-duty vehicles of the present invention is shown generally at 200 in FIGS. 4-7. FIGS. 5-7 show first preferred embodiment shock lower mount support assembly 200 of the present invention incorporated into an axle/suspension system 10 of the type described in detail above. Because axle/suspension system 10 generally includes an identical pair of shock lower mount support assemblies 200 of the present invention, each one utilized in conjunction with an identical shock lower mount assembly and suspension assembly, for sake of clarity only one of the shock lower mount support assemblies will be described below, with the understanding that a second support assembly is installed on the shock lower mount and beam of the opposite suspension assembly.

Figure 4:
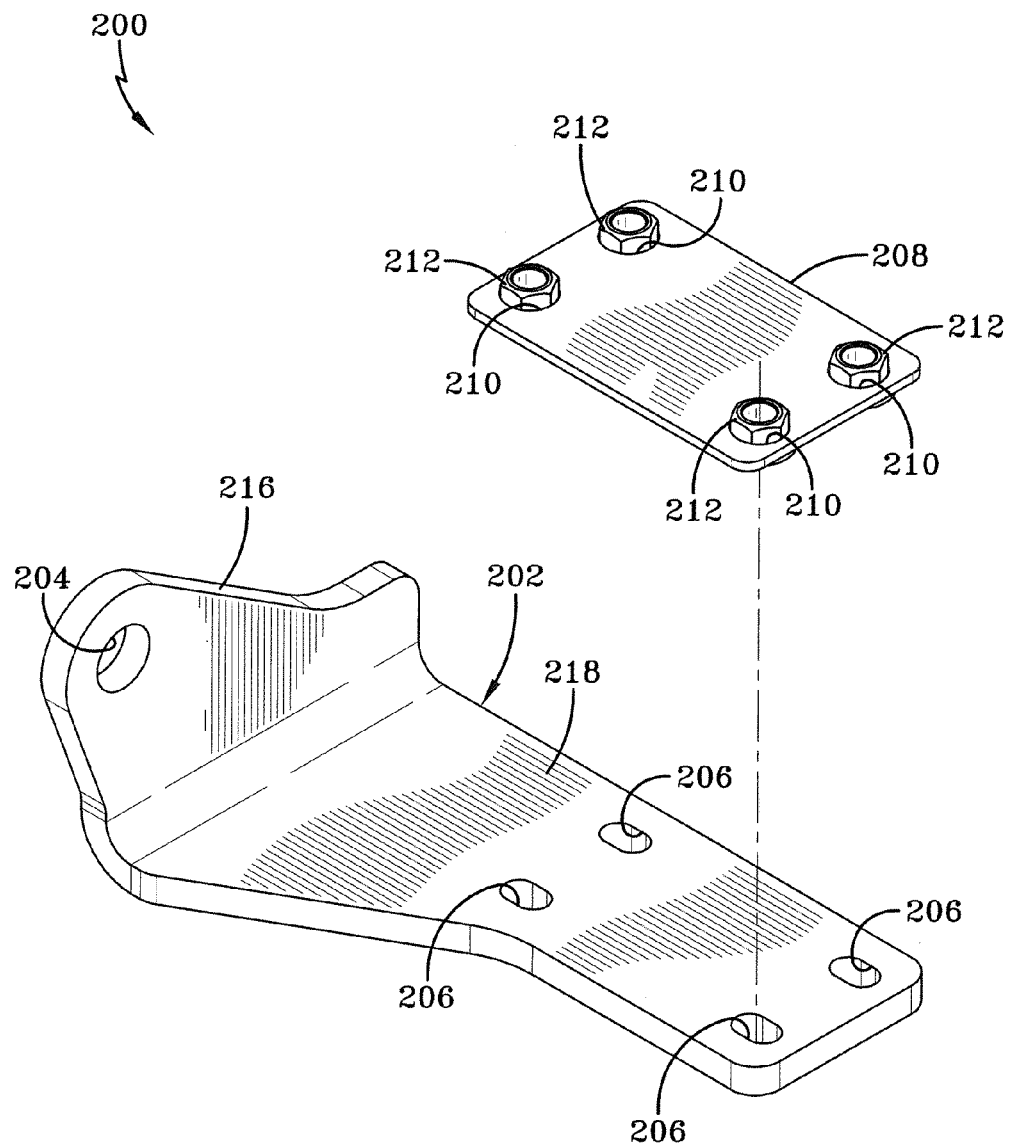
FIG. 4 is a perspective view of the component parts of a first preferred embodiment shock absorber lower mount support assembly of the present invention, showing the driver side shock support bracket and beam mounting plate.
Figure 4A:
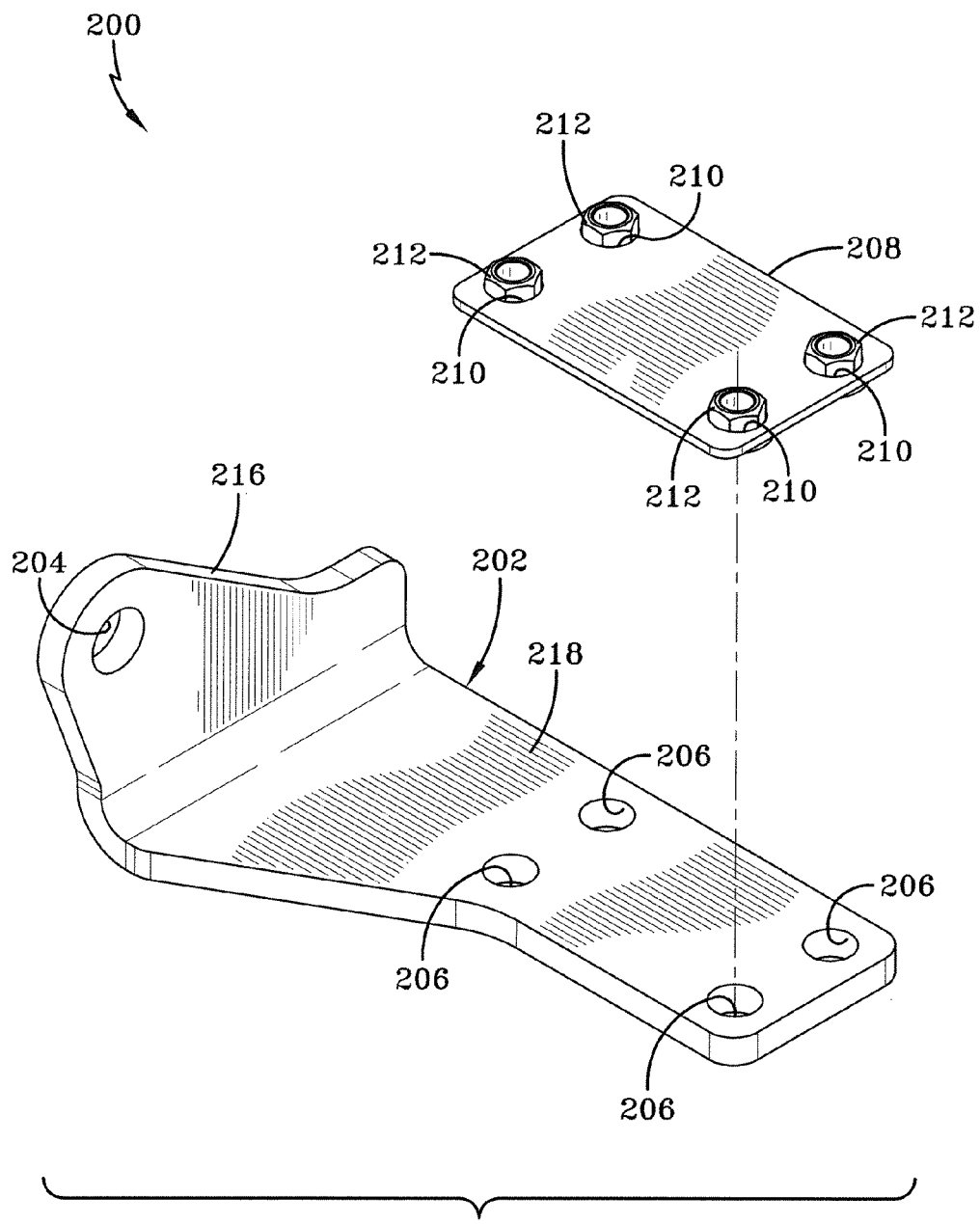
FIG. 4A is a perspective view of the component parts of a first preferred embodiment shock absorber lower mount support assembly of the present invention similar to FIG. 4, but showing an alternative configuration that utilizes over-sized openings in the shock support bracket.

Shock lower mount support assembly 200 of the present invention includes a generally L-shaped shock support bracket 202 and a generally flat rectangular-shaped beam mounting plate 208. Shock support bracket 202 and beam mounting plate 208 are formed from steel or other rigid material well known in the art. Shock support bracket 202 includes a short portion 216 and an elongated portion 218. Shock support bracket short portion 216 is formed with a generally circular opening 204. Shock support bracket elongated portion 218 is formed with a plurality of elongated openings 206 arranged in a generally rectangular configuration. It should be understood that alternative shaped openings 206 could also be utilized in connection with shock support bracket 202, without changing the overall concept or operation of the invention. With particular reference to FIG. 4A, over-sized circular-shaped openings 206 are shown formed in shock support bracket elongated portion 218. Beam mounting plate 208 is formed with a plurality of generally circular openings 210 arranged in a generally rectangular configuration. Each opening 210 is fitted with a lock nut 212. Beam mounting plate openings 210 and shock support bracket openings 206 are located on their respective structures so that they are generally aligned with one another when shock lower mount support assembly 200 is installed. Having described the structure of shock lower mount support assembly 200 of the present invention, the installation of the shock lower mount support assembly on a shock lower mount assembly of a suspension assembly of an axle/suspension system will now be described in detail below.

Turning now to FIGS. 5-7, shock lower mount support assembly 200 of the present invention is shown assembled and mounted on a suspension assembly 14 of an axle/suspension system 10. More particularly, a shock absorber 40 extends between and is mounted at its upper end to hanger 16 and at its lower end to suspension beam 18. More specifically, shock absorber 40 includes top eyelet 51 and bottom eyelet 52. Top eyelet 51 and bottom eyelet 52 are each formed with continuous opening 76,77, respectively. Shock top eyelet 51 is mounted on inboardly extending wing 17 of hanger 16 via shock upper mount assembly 50, which includes shock upper mount bracket 19 and fastener 15 (FIG. 1). More particularly, fastener 15 is disposed through an opening (not shown) formed in shock mount bracket 19 and through aligned continuous opening 76 formed in top eyelet 51 in order to mount the upper end of shock absorber 40 to hanger 16.

Shock bottom eyelet 52 is mounted on suspension beam 18 via a shock lower mount assembly 75, which includes bolt 53, first, second and third washers 54,69,70, respectively, shock lower mount support assembly 200 of the present invention, inboard shock spacer 55, shock backing plate 56, outboard shock spacer 57 and lock nut 58. More particularly, bolt 53 includes threaded end 71 and first washer 54. Bolt threaded end 71 is disposed through opening 204 of shock support bracket short portion 216 of shock lower mount support assembly 200, through second washer 69, through continuous opening 77 formed in shock bottom eyelet 52, through third washer 70, through shock spacer 55, through opening 59 formed in suspension beam inboard sidewall 66, through shock backing plate 56, and through outboard shock spacer 57. Lock nut 58 is loose-fit threaded onto bolt threaded end 71. Elongated portion 218 of shock mount bracket 202 is disposed on a bottom surface 78 of bottom wall 63 of beam 18 so that elongated openings 206 are aligned with openings (not shown) formed in the bottom wall of the beam and also with lock nuts 212 of beam mounting plate 208. More specifically, beam mounting plate 208 is disposed on a top surface 79 of beam bottom wall 63. Each one of a plurality of bolts 214 is disposed through respective ones of elongated openings 206 and the aligned openings formed in beam bottom wall 63 to engage with lock nuts 212, in order to loose-fit attach shock support bracket 202 and beam mounting plate 208 of shock lower mount support assembly 200 of the present invention to bottom surface 78 and top surface 79, respectively, of beam bottom wall 63.

In accordance with an important feature of the present invention and in order to properly complete assembly of shock lower mount support assembly 200 of the present invention, first the shock lower mount support assembly is disposed on beam 18 and shock lower mount assembly 75 as set forth above by loose-fit bolts 214 and loose-fit bolt 53, respectively. Bolt 53 then is torqued or tightened pursuant to required manufacturing guidelines. Because bolts 214 are loose fit and because shock support bracket openings 206 are transversely elongated, shock support bracket 202 has play to move transversely outboardly when bolt 53 is tightened. This is important because the outboard transverse movement of shock support bracket 202 allows proper clamp load to be imparted onto bolt 53 without damaging the shock support bracket, beam 18, or any associated components thereof. Once bolt 53 is tightened to specification, then bolts 214 are torqued or tightened, drawing shock support bracket elongated portion 218 and mounting plate 208 against bottom and top surfaces 78,79, respectively, of beam wall 63 in order to fixedly attach shock lower mount support assembly 200 to beam 18. This arrangement of components provides a broader area of support to the shock lower mount-beam attachment interface and distributes loads from both the inboard and outboard attachment points of shock absorber 40 to beam 18 of its respective suspension assembly 14, which assures conservation of the clamp load at the shock lower mount-beam interface.

A second preferred embodiment shock absorber lower mount support assembly for heavy-duty vehicles of the present invention is shown generally at 300 in FIGS. 8-12. FIGS. 9-12 show shock lower mount support assembly 300 of the present invention being incorporated into an axle/suspension system 10 of the type described in detail above. Because axle/suspension system 10 generally includes an identical pair of shock lower mount support assemblies 300 of the present invention, each one utilized in conjunction with an identical shock lower mount assembly and suspension assembly, for sake of clarity only one of the shock lower mount support assemblies will be described below, with the understanding that a second shock lower mount support assembly is installed on the shock lower mount assembly of the opposite suspension assembly.

Shock lower mount support assembly 300 of the present invention includes an L-shaped shock support bracket 302. Shock support bracket 302 is formed from steel or other rigid material well known in the art. Shock support bracket 302 includes a short portion 316 and an elongated portion 318. Shock support bracket short portion 316 is formed with a generally circular opening 304. Shock support bracket elongated portion 318 is formed with a pair of transversely elongated openings 306 arranged and spaced longitudinally with respect to beam 18. Having described the structure of shock lower mount support assembly 300 of the present invention, the installation of the shock lower mount support assembly on a shock lower mount assembly of a suspension assembly of an axle/suspension system will now be described in detail below.

Turning now to FIGS. 9-12, shock lower mount support assembly 300 of the present invention is shown assembled and mounted on a suspension assembly 14 of an axle/suspension system 10. More particularly, a shock absorber 40 extends between and is mounted at its upper end to hanger 16 and at its lower end to suspension beam 18. More specifically, shock absorber 40 includes top eyelet 51 (FIG. 1) and bottom eyelet 52 (FIG. 2). Top eyelet 51 and bottom eyelet 52 are each formed with continuous opening 76,77, respectively. Shock top eyelet 51 is mounted on inboardly extending wing 17 of hanger 16 via shock upper mount assembly 50, which includes shock upper mount bracket 19 and fastener 15 (FIG. 1). More particularly, fastener 15 is disposed through an opening (not shown) formed in shock mount bracket 19 and through aligned continuous opening 76 formed in top eyelet 51 in order to mount the upper end of shock absorber 40 to hanger 16.

Shock bottom eyelet 52 is mounted on suspension beam 18 via a shock lower mount assembly 75, which includes bolt 53, first, second, and a third washers 54,69,70, respectively, second preferred embodiment shock lower mount support assembly 300 of the present invention, inboard shock spacer 55, a beam bracket 72, a brake chamber mounting bracket 73 and lock nut 58. More particularly, bolt 53 includes threaded end 71 and first washer 54. Bolt threaded end 71 is disposed through opening 304 of shock support bracket short portion 316 of shock lower mount support assembly 300, through second washer 69, through continuous opening 77 formed in shock bottom eyelet 52, through third washer 70, through inboard shock spacer 55, through an opening (not shown) formed in beam bracket 72, and through an opening (not shown) formed in brake chamber mounting bracket 73. Lock nut 58 is loose-fit threaded onto bolt threaded end 71. Elongated portion 318 of shock mount bracket 302 is disposed on a bottom surface 78 of bottom wall 63 of beam 18 so that elongated openings 306 are aligned with openings (not shown) formed in the bottom wall of the beam. Each one of a pair of bolts 314 is disposed through a respective one of beam bottom wall openings and its aligned elongated opening 306. Each one of a pair of lock nuts 312 is threadably engaged with a respective one of bolts 314 in order to loose-fit attach shock support bracket 302 of shock lower mount support assembly 300 of the present invention to bottom surface 78 of beam bottom wall 63.

In accordance with an important feature of the present invention and in order to properly complete assembly of shock lower mount support assembly 300 of the present invention, first the shock lower mount support assembly is disposed on beam 18 and shock lower mount assembly 75 as set forth above by loose fit bolts 314 and loose fit bolt 53, respectively. Bolt 53 then is torqued or tightened pursuant to required manufacturing guidelines. Because bolts 314 are loose fit and because shock support bracket openings 306 are transversely elongated, shock support bracket 302 has play to move transversely outboardly when bolt 53 is tightened. This is important because the outboard transverse movement of shock support bracket 302 allows proper clamp load to be imparted onto bolt 53 without damaging the shock support bracket, beam 18, or any associated components thereof. Once Bolt 53 is tightened to specifications, then bolts 314 are torqued or tightened, drawing shock support bracket elongated portion 318 against bottom surface 78 of beam bottom wall 63 in order to fixedly attach shock lower mount support assembly 300 to beam 18. This arrangement of components provides a broader area of support to the shock lower mount-beam interface and distributes loads from both the inboard and outboard attachment points of shock absorber 40 to beam

18 of its respective suspension assembly 14, which assures conservation of the clamp load at the shock lower mount-beam interface.

First and second preferred embodiment shock mount support assemblies 200,300 for heavy-duty vehicle axle/suspension systems of the present invention each solves the above-noted problems associated with known prior art shock lower mount assemblies. More specifically, shock mount support assemblies 200,300 provide an improved shock lower mount support assembly and method for installation thereof that results in reduced stress at the attachment interface of the shock lower mount assembly to the beam of its respective suspension assembly, by conserving clamp load at the shock lower mount-beam interface, by providing a broader area of support to the attachment interface and by distributing loads from both the inboard and outboard attachment points of the shock absorber to the beam of its respective suspension assembly. By utilizing first and second preferred embodiment shock mount support assemblies 200,300 for heavy-duty vehicles of the present invention, a more robust shock absorber can be utilized on the vehicle to absorb stresses and forces common to highway travel with much greater efficiency and less risk of reducing clamp load at the shock lower mount-beam interface and decreasing durability of the shock absorber, mounting structure and/or other components such as the vehicle frame, hanger or suspension assembly, because of the more robust mounting of the present invention.

It is contemplated that preferred embodiment shock mount support assemblies 200,300 of the present invention could be utilized on tractor-trailers or heavy-duty vehicles having one or more than one axle, and consequently one or more than one axle/suspension system, without changing the overall concept or operation of the present invention. It is also contemplated that the shock mount support assembly of the present invention could be utilized on all-types of vehicles, including those other than heavy-duty type vehicles, such as light-duty vehicles, without changing the overall concept or operation of the present invention. It is further contemplated that preferred embodiment shock mount support assemblies 200,300 of the present invention could be utilized on vehicles having frames or subframes which are moveable or non-movable without changing the overall concept of the present invention. It is yet even further contemplated that preferred embodiment shock mount support assemblies 200,300 of the present invention could be utilized on all types of air-ride leading and/or trailing arm beam-type axle/suspension system designs known to those skilled in the art without changing the overall concept or operation of the present invention. For example, the present invention finds application with beams or arms that are made of materials other than steel, such as aluminum, other metals, metal alloys, composites, and/or combinations thereof. It is also contemplated that preferred embodiment shock mount support assemblies 200,300 of the present invention could be utilized on axle/suspension systems having either an overslung/top-mount configuration or an underslung/bottom-mount configuration, without changing the overall concept or operation of the present invention. The present invention also finds application in beams or arms with different designs and/or configurations than that shown above, such as solid beams, shell-type beams, truss structures, intersecting plates, spring beams and parallel plates. The present invention also finds application in intermediary structures such as spring seats. It is also contemplated that preferred embodiment shock mount support assemblies 200,300 of the present invention could be utilized in conjunction with other types of air-ride rigid beam-type axle/suspension systems such as those using U-bolts, U-bolt brackets/axle seats and the like, without changing the overall concept or operation of the present invention. It is also contemplated that preferred embodiment shock mount support assemblies 200,300 of the present invention could be utilized with different types of hangers, without changing the overall concept or operation of the present invention. It is also contemplated that preferred embodiment shock mount support assemblies 200,300 of the present invention could be formed from various materials, including but not limited to composites, metal and the like, without changing the overall concept or operation of the present invention. It is yet even further contemplated that preferred embodiment shock mount support assemblies 200,300 of the present invention could be utilized with fewer than two, more than two, or more than four elongated openings 206,306 such as one, three or five or more openings without changing the overall concept or operation of the present invention. It is further contemplated that preferred embodiment shock mount support assemblies 200,300 of the present invention could be utilized in combination with all prior art shock absorbers and other similar devices and the like, without changing the overall concept of the present invention. It is even further contemplated that other arrangements of elongated openings 206,306 of first and second preferred embodiment shock lower mount support assemblies 200,300 of the present invention could be utilized so long as conservation of the clamp load at shock lower mount assembly 75 is sustained during operation of the vehicle. It is yet even further contemplated that openings 206,306 of first and second preferred embodiment shock mount support assemblies 200,300 of the present invention could be any shape or size, such as rectangular or oval, so long as they allow transverse movement of shock support brackets 202,302 when bolt 53 of shock lower mount assembly 75 is tightened. It is contemplated that openings 206,306 of first and second preferred embodiment shock mount support assemblies 200,300 of the present invention could be elongated, oversized, or larger than the diameter of bolts 214,314, without changing the overall concept or operation of the present invention. It is also contemplated that shock mount support assemblies 200,300 of the present invention could be used with different types of fasteners, without changing the overall concept or operation of the present invention. It is even further contemplated that shock mount support assemblies 200,300 of the present invention could utilize other arrangements of fasteners in order to mount shock support bracket 202,302 to beam 18, without changing the overall concept or operation of the present invention. It is also contemplated that openings 210 of beam mounting plate 208 of the present invention could be any shape or size, such as rectangular or oval, in order to allow longitudinal movement of the plate to account for tolerance stacks associated with attachment of the shock absorber, without changing the overall concept or operation of the present invention.

Accordingly, the shock mount support assembly of the present invention is simplified, provides an effective, safe, inexpensive and efficient structure and method for installation of the assembly, which achieves all the enumerated objectives set forth above. The shock mount support assembly of the present invention eliminates difficulties found in prior art shock mounts and obtains new results in the field.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the shock mount support assembly of the present invention is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A shock mount support assembly for a shock absorber of a suspension assembly of an axle/suspension system of a vehicle, said shock absorber operatively attached at its lower end to said suspension assembly and operatively attached at its upper end to a fixed component of a frame of said vehicle, said support assembly comprising:
   a shock support bracket rigidly attached to the suspension assembly, said lower end of said shock absorber in turn being disposed between and rigidly attached to said shock support bracket and said suspension assembly, for supporting the lower end of the shock absorber during operation of the vehicle.

2. The shock mount support assembly of claim 1, said shock support bracket including a generally L-shaped cross section having a short portion and an elongated portion, said short portion of the shock support bracket connected to said shock absorber, said elongated portion rigidly attached to said suspension assembly.

3. The shock mount support assembly of claim 2, said short portion being formed with an opening, said opening aligning with an eyelet on said lower end of said shock absorber, a fastener being disposed through said short portion opening and said eyelet to connect said eyelet to said shock support bracket short portion.

4. The shock mount support assembly of claim 2, wherein said elongated portion includes an opening, said opening aligned with an opening formed on a wall of a beam of said suspension assembly, a fastener disposed through said pair of aligned openings to rigidly attach the shock support bracket to the beam wall of the suspension assembly.

5. The shock mount support assembly of claim 4, further comprising a plate disposed on an opposite side of said beam wall adjacent said shock support bracket, said plate being formed with an opening, said opening aligned with said beam wall opening and said shock support bracket opening, said fastener disposed through each of said aligned openings of said shock support bracket, said beam wall and said plate to rigidly attach the shock support bracket to the beam wall and the plate.

6. The shock mount support assembly of claim 4, wherein said shock support bracket opening is elongated.

7. The shock mount support assembly of claim 4, wherein said shock support bracket opening is larger than a diameter of said fastener.

8. The shock mount support assembly of claim 1, wherein said shock support bracket includes an opening, said opening aligned with a respective opening formed on a wall of a beam of said suspension assembly, a fastener disposed through the aligned openings to rigidly attach the shock support bracket to the beam wall of the suspension assembly.

9. The shock mount support assembly of claim 8, wherein said shock support bracket opening is elongated.

10. The shock mount support assembly of claim 8, wherein said shock support bracket opening is larger than a diameter of said fastener.

11. The shock mount support assembly of claim 8, further comprising a plate disposed on an opposite side of said beam wall adjacent said shock support bracket, said plate being formed with an opening, said opening aligned with said beam wall opening and said shock support bracket opening, said fastener disposed through said aligned openings of said shock support bracket, said beam wall and said plate, to rigidly attach the shock support bracket to the beam wall and the plate.

12. The shock mount support assembly of claim 1, wherein said shock support bracket includes at least two openings, each one of said at least two openings aligned with an opening formed on a wall of a beam of said suspension assembly, a fastener disposed through each pair of said aligned openings to rigidly attach the shock support bracket to the beam wall of the suspension assembly.

13. The shock mount support assembly of claim 12, wherein each one of said at least two shock support bracket openings is elongated.

14. The shock mount support assembly of claim 12, wherein each one of said at least two shock support bracket openings is larger than a diameter of said fasteners.

15. The shock mount support assembly of claim 12, further comprising a plate disposed on an opposite side of said beam wall adjacent said shock support bracket, said plate being formed with at least two openings, each one of said at least two openings aligned with respective ones of said beam wall openings and said at least two shock support bracket openings, said fastener disposed through each of said aligned openings of said shock support bracket, said beam wall and said plate, to rigidly attach the shock support bracket to the beam wall and the plate.

16. A method for installing a shock absorber of a suspension assembly of an axle/suspension system of a vehicle, said shock absorber operatively attached at its lower end to said suspension assembly and operatively attached at its upper end to a fixed component of a frame of said vehicle, said method including the following steps:
   a) providing a shock support bracket including an opening, said opening aligned with an opening formed in the suspension assembly;
   b) disposing a first fastener through said pair of aligned shock support bracket and suspension assembly openings and loose-fitting said first fastener, and disposing a second fastener through an opening in said shock support bracket, an eyelet of said lower end of the shock absorber and an aligned opening in said suspension assembly, and loose-fitting said second fastener;
   c) torquing the second fastener to connect the shock support bracket and said shock absorber lower end eyelet to the suspension assembly; and
   d) tightening the first fastener to rigidly attach said shock support bracket to said suspension assembly.

17. The method for installing a shock absorber of a suspension assembly of an axle/suspension system of a vehicle of claim 16, wherein said shock support bracket opening is elongated or is larger than a diameter of said first fastener.

18. A method for installing a shock absorber of a suspension assembly of an axle/suspension system of a vehicle, said shock absorber operatively attached at its lower end to said suspension assembly and operatively attached at its upper end to a fixed component of a frame of said vehicle, said method including the following steps:
   a) providing a shock support bracket including an opening, said opening aligned with an opening formed in the suspension assembly;

b) providing a plate disposed on said suspension assembly opposite said shock support bracket, said plate being formed with an opening, said opening aligned with said suspension assembly opening and said support bracket opening;

c) disposing a first fastener through said aligned openings of said shock support bracket, said suspension assembly and said plate and loose-fitting said first fastener, and disposing a second fastener through an opening in said shock support bracket, an eyelet of said lower end of the shock absorber and an aligned opening in said suspension assembly and loose-fitting said second fastener;

d) torquing the second fastener to connect the shock support plate and said shock absorber lower end eyelet to the suspension assembly; and e) tightening the first fastener disposed through said aligned openings of said shock support bracket, said suspension assembly and said plate, to rigidly attach said shock support bracket and the plate to the suspension assembly.

19. The method for installing a shock absorber of a suspension assembly of an axle/suspension system of a vehicle of claim 18, wherein said shock support bracket opening is elongated or is larger than a diameter of said first fastener.

20. A shock mount support assembly for a shock absorber of a suspension assembly of an axle/suspension system of a vehicle, said shock absorber operatively attached at its lower end to said suspension assembly and operatively attached at its upper end to a fixed component of a frame of said vehicle, said support assembly comprising:

said lower end of said shock absorber connected to a shock support bracket, said shock support bracket in turn rigidly attached to said suspension assembly, for supporting said lower end of said shock absorber during operation of said vehicle, said shock support bracket including an opening, said opening aligned with a respective opening formed on a wall of a beam of said suspension assembly, a fastener disposed through the aligned openings to rigidly attach the shock support bracket to the beam wall of the suspension assembly, a plate disposed on an opposite side of said beam wall adjacent said shock support bracket, said plate being formed with an opening, said opening aligned with said beam wall opening and said shock support bracket opening, said fastener disposed through said aligned openings of said shock support bracket, said beam wall and said plate, to rigidly attach the shock support bracket to the beam wall and the plate.

21. A shock mount support assembly for a shock absorber of a suspension assembly of an axle/suspension system of a vehicle, said shock absorber operatively attached at its lower end to said suspension assembly and operatively attached at its upper end to a fixed component of a frame of said vehicle, said support assembly comprising:

said lower end of said shock absorber connected to a shock support bracket, said shock support bracket in turn rigidly attached to said suspension assembly, for supporting said lower end of said shock absorber during operation of said vehicle, said shock support bracket including a generally L-shaped cross section having a short portion and an elongated portion, said short portion of the shock support bracket connected to said shock absorber, said elongated portion rigidly attached to said suspension assembly, wherein said elongated portion includes an opening, said opening aligned with an opening formed on a wall of a beam of said suspension assembly, a fastener disposed through said pair of aligned openings to rigidly attach the shock support bracket to the beam wall of the suspension assembly, a plate disposed on an opposite side of said beam wall adjacent said shock support bracket, said plate being formed with an opening, said opening aligned with said beam wall opening and said shock support bracket opening, said fastener disposed through each of said aligned openings of said shock support bracket, said beam wall and said plate to rigidly attach the shock support bracket to the beam wall and the plate.

22. A shock mount support assembly for a shock absorber of a suspension assembly of an axle/suspension system of a vehicle, said shock absorber operatively attached at its lower end to said suspension assembly and operatively attached at its upper end to a fixed component of a frame of said vehicle, said support assembly comprising:

said lower end of said shock absorber connected to a shock support bracket, said shock support bracket in turn rigidly attached to said suspension assembly, for supporting said lower end of said shock absorber during operation of said vehicle, wherein said shock support bracket includes at least two openings, each one of said at least two openings aligned with an opening formed on a wall of a beam of said suspension assembly, a fastener disposed through each pair of said aligned openings to rigidly attach the shock support bracket to the beam wall of the suspension assembly, a plate disposed on an opposite side of said beam wall adjacent said shock support bracket, said plate being formed with at least two openings, each one of said at least two openings aligned with respective ones of said beam wall openings and said at least two shock support bracket openings, said fastener disposed through each of said aligned openings of said shock support bracket, said beam wall and said plate, to rigidly attach the shock support bracket to the beam wall and the plate.

* * * * *